United States Patent [19]

Ohmi et al.

[11] Patent Number: 4,938,331
[45] Date of Patent: Jul. 3, 1990

[54] FLUID COUPLING FOR ENGINE COOLING SYSTEM

[75] Inventors: Atsushi Ohmi, Anjo; Makoto Nakagawa, Kariya, both of Japan

[73] Assignee: Aisin Seiki Kabushiki Kaisha, Kariya, Japan

[21] Appl. No.: 412,132

[22] Filed: Sep. 25, 1989

[30] Foreign Application Priority Data

Sep. 27, 1988 [JP] Japan .................. 63-241546

[51] Int. Cl.[5] .......................... F16D 35/00; F01P 7/02
[52] U.S. Cl. .............................. 192/58 B; 192/58 C; 192/82 T; 123/41.12
[58] Field of Search .............. 192/58 B, 58 C, 82 T, 192/85 V; 123/41.12

[56] References Cited

U.S. PATENT DOCUMENTS

| | | | |
|---|---|---|---|
| 2,879,755 | 3/1959 | Weir | 192/58 C X |
| 3,019,875 | 2/1962 | Fowler | 192/58 C |
| 3,101,825 | 8/1963 | Caroli et al. | 192/58 C X |
| 3,180,571 | 4/1965 | Caroli et al. | 192/58 C X |
| 3,880,265 | 4/1965 | Elmer | 192/58 B |
| 3,893,555 | 7/1975 | Elmer | 192/58 B |
| 4,467,903 | 8/1984 | Hayashi et al. | 192/58 B |

FOREIGN PATENT DOCUMENTS

| | | | |
|---|---|---|---|
| 57-161325 | 10/1982 | Japan | 192/82 T |
| 61-149623 | 7/1986 | Japan | 192/58 B |

Primary Examiner—Richard Lorence
Attorney, Agent, or Firm—Oblon, Spivak, McClelland, Maier & Neustadt

[57] ABSTRACT

A fluid coupling for an engine cooling system includes a driving member rotationably coupled to a driven member by a viscous fluid coupling. The viscous fluid coupling is controlled to vary the torque transfer from the driving member to the driven member as a function of a sensed engine liquid coolant temperature.

6 Claims, 4 Drawing Sheets

४,९३८,३३१

FLUID COUPLING FOR ENGINE COOLING SYSTEM

BACKGROUND OF THE INVENTION

1. Field of the Invention

The present invention relates to a fluid coupling for an engine cooling system and more particularly to a fluid coupling for use in controlling the revolution of the cooling fan of an engine of a vehicle, etc.

2. Background of the Related Art

A conventional fluid coupling is disclosed in U.S. Pat. No. 4,702,360, and is shown in FIG. 6. There, a rotor 71 is fixed to a shaft 72, and has helical grooves 71a on an outer peripheral surface and a hole 71b. A labyrinth 71c of rotor 71 is formed on an annular surface of the rotor 71. A body 73 is supported by the shaft 72 via a bearing 74. A labyrinth 73a of body 73 is formed on an interior surface of the body 73. A working volume 75 is defined by the labyrinth 71c of rotor 71 and the labyrinth 73a of the body 73.

A cover 76 is fixed to the body 73. A fan (not shown) is fixed to the circumference of the body 73 and the cover 76. A dividing plate 77 is fixed to the cover 76, and divides inner portion of the body 73 and the cover 76 into the working volume 75 and a storage volume 78. The dividing plate 77 has a hole 77a, and the hole 77a is opened or closed by a plate 79 with a hole 79a. The plate 79 is rotated by a bimetal 80 fixed to the cover 76.

In the above-mentioned fluid coupling, the plate 79 is rotated by the bimetal 80 which detects the temperature of air drawn through a radiator (not shown) by the fan. At high air temperatures, the hole 79a overlaps with the hole 77a with the result that the viscous fluid which is in the storage volume 78 flows into the working volume 75. Thus, the rotation of the shaft 72 is transmitted to the body 73 and the cover 76, so that the fan is rotated.

However, the quantity of the viscous fluid in the working volume 75 depends on the quantity of the fluid which is transmitted from the storage volume 78 to the working volume 75 due to the action of the bimetal 80. Since the bimetal 80 detects the temperature of air drawn through the radiator by the fan, and since this air temperature will not necessarily vary in correspondence with the water temperature in the engine, it is difficult to obtain a revolution of the fan in accordance with the temperature of the engine.

SUMMARY OF THE INVENTION

Accordingly, it is a primary object of the present invention to control the revolution of the fan in accordance with the temperature of the cooling liquid in the engine.

It is another object of the present invention to prevent the fluid coupling from unnecessary revolution when the engine starts.

The above, and other, objects are accomplished according to the present invention by a fluid coupling for an engine cooling system, comprising a driving member, a driven member having an engine cooling element, rotational torque coupling means between the driving member and the driven member, an engine coolant liquid temperature sensor, and means for controlling the torque coupling means as a function of a sensed engine coolant liquid temperature. The engine cooling element is thus driven as a function of the engine coolant liquid temperature.

According to another feature of the invention, the driven member includes means enclosing in a sealed working chamber and the driving member comprises a rotor fitted in the working chamber and having means drivable by the engine to be cooled.

According to a further feature of the invention, the torque coupling means can comprise a viscous liquid in the working chamber and engaging the rotor to transfer torque between the rotor and the driven member due to the viscous shear in the viscous liquid. The torque coupling means can further comprise labyrinth means on the rotor and on at least one of the driven member and a plate, at positions facing the labyrinth means on the rotor.

According to a further feature of the invention, the driven member comprising a casing rotatably supported by the driving member and a cover sealingly mounted to the casing, while the means for controlling the torque coupling means comprise a plate sealingly held in the driven member and rotating therewith, the plate cooperating with the driven member to define the working chamber. The plate is movable toward and away from the rotor, whereby a volume of the working chamber varies so as to vary an area of contact of the viscous liquid on the rotor and the torque transferred from the rotor to the driven member.

According to a further feature of the invention, the torque coupling means further comprise spring means for normally biasing the plate toward the rotor so as to decrease the volume of the working chamber, and means for applying a negative gas pressure to a pressure chamber at a side of the plate opposite the working chamber so as to increase the volume of the working chamber.

According to a further feature of the invention, the means for applying a negative pressure comprise a valve controllable to supply either atmospheric pressure, or negative pressure from the intake system of the engine, to the pressure chamber, and a control unit receiving coolant temperature signals from the sensor and controlling the valve as a function of the coolant temperature signals.

Alternatively, the spring means can bias the plate for movement away from the rotor and the gas pressure is a positive pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
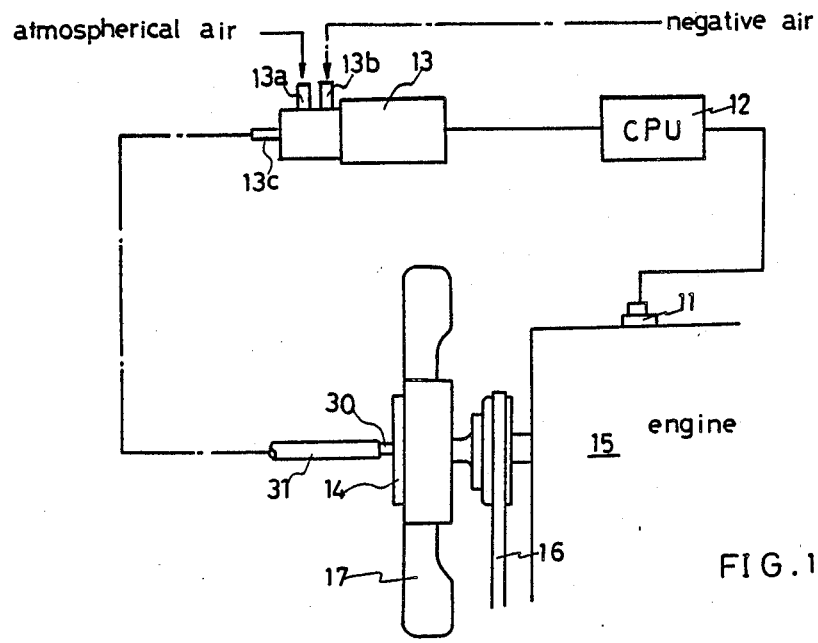
FIG. 1 is a schematic view of a cooling-system of an engine for which the present invention is employed.

Referring first to FIG. 1 wherein a cooling-system of an engine 15 is shown, an output-signal from a coolant liquid temperature sensor 11 is inputted into a central processing unit 12. The coolant liquid may be water, a water/anti-freeze mixture, or any other liquid coolant. A control signal from the central processing unit 12 controls a solenoid control valve 13. An atmospheric pressure and a negative pressure, for example an engine vacuum, are supplied respectively to an input port 13a and an input port 13b of the control valve 13, and the atmospheric pressure or negative pressure is alternatively outputted to a fluid coupling 14 from an output port 13c of the control valve 13 in response to the control signal.

A driving input member 21 of the fluid coupling 14 is connected with an output member (not shown) of the engine 15 by a belt 16. The driven or output member of the fluid coupling 14 is connected with an engine cooling element such as a fan 17.

Next, a detailed construction of the fluid coupling 14 will be described hereinafter with reference to FIG. 2.

A rotor 20 is fixed on a left end portion of the input member 21. A case 22 is rotatably supported by the input member 21 via a bearing 23. A cover 24 is fixed to the case 22 to form the output member of the fluid coupling 14. A sealing member 25 is arranged in a contact portion between the case 22 and the cover 24. The fan 17 is fixed on an outer surface of the cover 24. A plate 26 is slidable on an outer surface of a sleeve 24a of the cover which is in alignment with the axis of the input member 21. Between the outer surface of the sleeve 24a of the cover 24 and an inner surface of the plate 26 is provided a sealing member 27 for sealing therebetween. An inner surface of the cover 24 and an outer surface of the plate 26 are sealed by a sealing member 28. The plate 26 is urged toward the rotor 20 by a compression spring 29 which is disposed between the rotor 20 and the cover 24.

The cover 24 supports an input pipe 30 via a sealing type bearing 31. The bearing 31 seals between the cover 24 sealing type and the input pipe 30. A connecting pipe 31A is connected between the input pipe 30 and the output port 13c of the control valve 13. A sealed working chamber 32 is formed between the plate 26 and an inner surface of the case 22 and contains the rotor 20. A labyrinth 20A is formed in the working chamber 32. However, the labyrinth is not an essential component. Preferably, the labyrinth is formed between a left surface of the rotor 20 and an right surface of the plate 26. A viscous liquid such as silicone oil 33 is enclosed or filled in the working chamber 32.

A pressure chamber 34 is formed between the inner surface of the cover 24 and a left surface of the plate 26. A pressure chamber 35 is formed in the sleeve 24a, and is connected with the pressure chamber 34 via a passage 36.

A stepped portion 37 of the case 22 serves as a stopper for limiting rightward movement of the plate 26, and a surface 24b of the cover 24 serves as a stopper for limiting leftward movement of the plate 26.

The operation according to the embodiment is described hereinafter. It should be noted that the upper half portion and the lower half portion of FIG. 2 respectively represent the condition where the negative pressure is inputted in the pressure chamber 34 and where the atmospheric pressure is inputted in the pressure chamber 34.

When the engine 15 starts under the condition that the water temperature is low, the temperature sensor 11 sends a signal indicating a cold water temperature to the CPU 12.

The CPU 12 therefore controls the valve 13 so that the port 13b connects with the port 13c, so that the negative pressure which is supplied from an intake manifold (not shown) of the engine 15 is supplied to the pressure chamber 34 via the valve 13 and the connecting pipe 31A.

Therefore, the plate 26 is slidably moved in the leftward direction by the negative pressure in the pressure chamber 34, so that the height of the silicone oil 33 in the working chamber 32 is reduced. Consequently, the amount of silicone oil 33 which is engaged in the labyrinth is small, so that a transmitting torque which is transmitted from the input member 21 to the cover 24 via the plate 20 is at a minimum. Thus, the revolution of the fan 17 is low, so that the engine 15 is not substantially cooled.

As the engine 15 warms up, the water temperature of the cooling water of the engine 15 rises and a corresponding higher water temperature signal is inputted into the CPU 12 from the temperature sensor 11. At a sensed water temperature preprogrammed into the CPU 12, it controls the valve 13 such that the port 13a connected with the port 13c, so that the atmospheric pressure is supplied to the pressure chamber 34 via the valve 13 and the connecting pipe 31A.

Therefore, the plate 26 is slidably moved in the rightward direction by the spring 29, so that the height of the silicone oil 33 in the working chamber 32 rises. Consequently, the silicone oil 33 which is engaged in the labyrinth is increased, so that a transmitting torque which is transmitted from the input member 21 to the cover 24 through plate 20 is at a maximum. Thus, the revolution of the fan 17 is high, so that the engine 15 is cooled.

The valve 13 may be controlled by the CPU 12 such that the opening ratio, i.e. duty cycle, of the port 13a or the port 13b with the port 13c is variable with variations in water temperature, so that the transmitting torque which is transmitted from the input member 21 to the cover 24 via the plate 20 is also variable.

Figure 3:
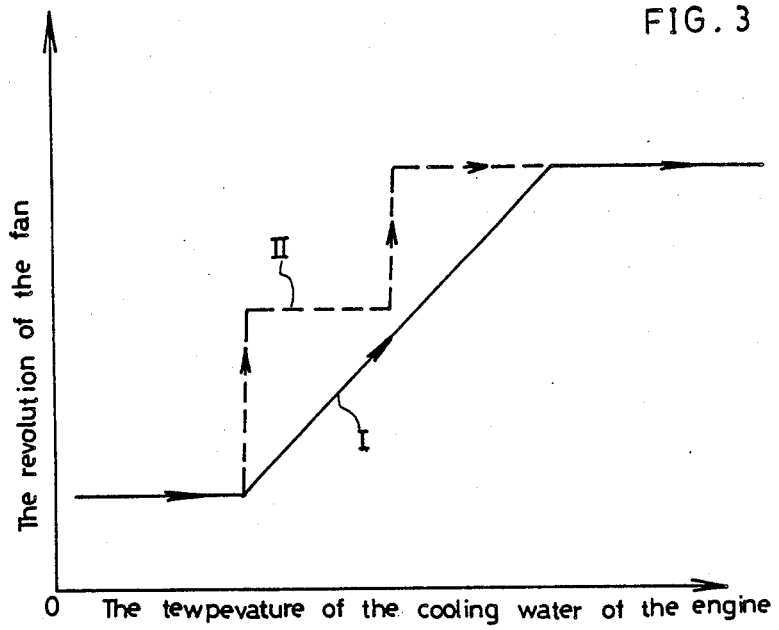
FIG. 3 is a characteristic chart showing the relationship between the revolution of the fan and the cooling water temperature of the engine according to the embodiment of FIG. 2.

The controlling method for the transmitting of torque is decided by the CPU 12 into which a controlling method is inputted. For example, the revolution of the fan 17 may be proportionally controlled with the temperature of the cooling water of the engine 15 as is shown by line 1 of FIG. 3. Alternatively, the revolution of the fan 17 may be controlled stepwise with the temperature of the cooling water of the engine 15, as is shown by line II in FIG. 3.

Figure 2:
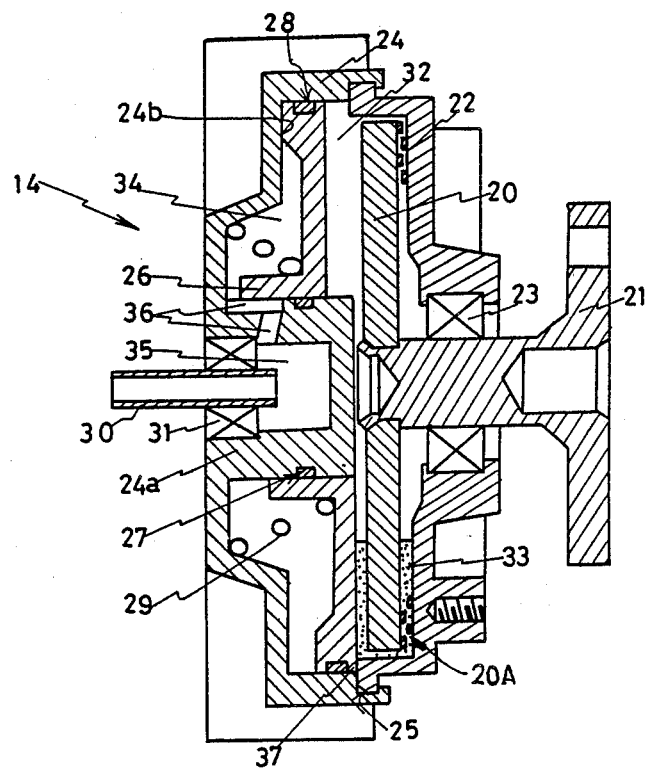
FIG. 2 is a cross-sectional view of an embodiment of fluid coupling according to the invention.
Figure 4:
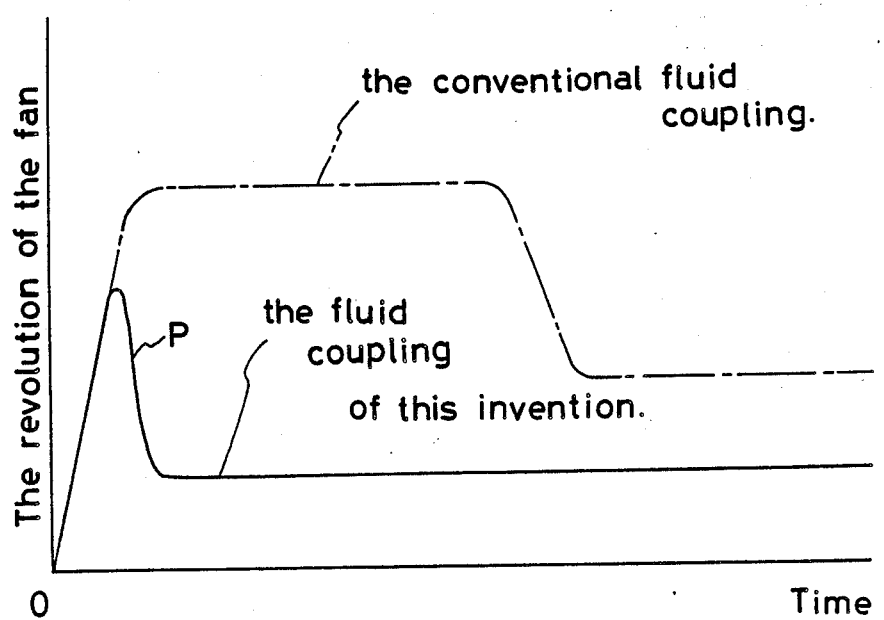
FIG. 4 is a characteristic chart showing the relationship between the revolution of the fan and time according to the embodiment of FIG. 2.
Figure 6:
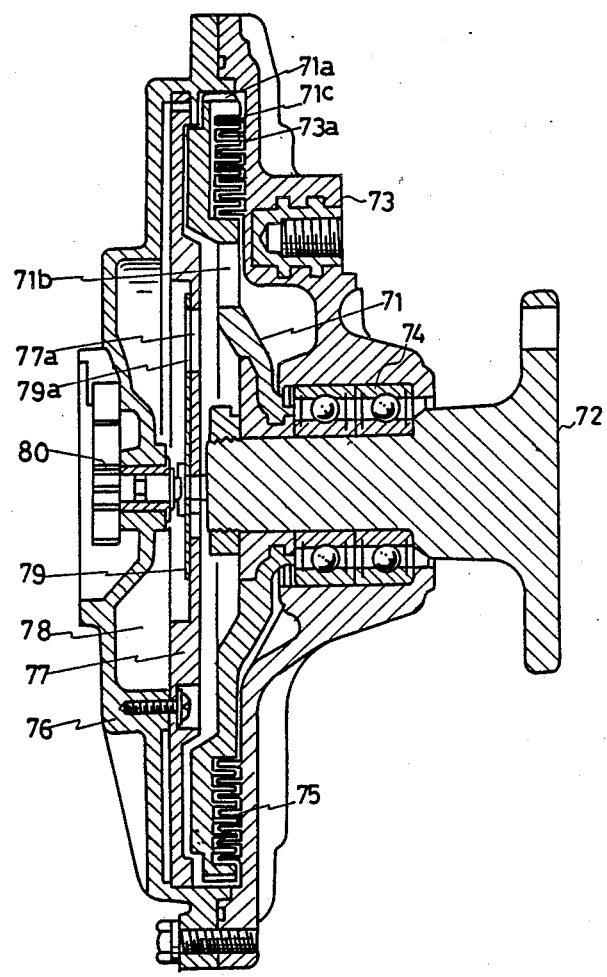
FIG. 6 is a cross-sectional view of a conventional fluid coupling.

Referring to FIGS. 2 and 4, when the engine 15 is stopped, the spring 29 biases the plate 26 to the right, so that the surface contact between the silicone oil 33 and the labyrinth is great. This produces an initial brief peak P in the rotational speed of the fan 17 as the engine is started. However, once the engine has started, the engine vacuum is immediately applied to the pressure chamber 34 so as to retract the plate 26 to the left. Therefore, a fan rotational speed rapidly drops to a low level, and does not again increase until a high engine coolant temperature is determined by the sensor 11.

Figure 5:
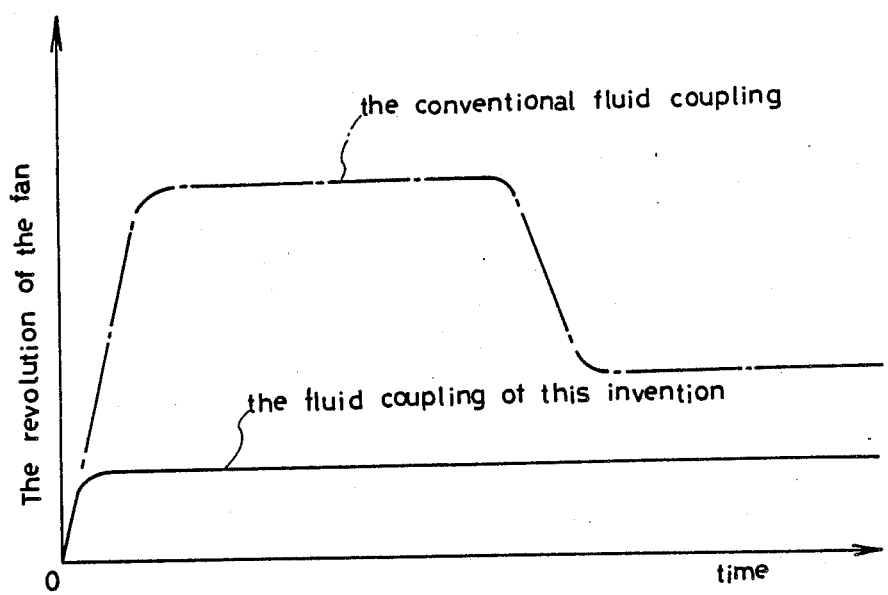
FIG. 5 corresponding to FIG. 4, but for an embodiment having a tension spring.

It should be noted that a tension spring can be used instead of the compression spring as the spring 29, upon supplying positive pressure to the input port 13b of the valve 13. In this case, when the engine 15 is stopped, the amount of silicone oil 33 in the labyrinth is small since the plate 26 is urged to the left by the tension spring. Thus, when the engine 15 starts under the condition that the water temperature is low, the revolution of the fan 17 is uniformly low (FIG. 5). However, as positive pressure is applied to the pressure chambers upon the sensing of increased engine temperature, the revolution of the fan 17 increases.

This fluid coupling 14 is controlled by the temperature of the cooling water of the engine, so that unnecessary revolution of the fan is restrained. This may be contrasted with the conventional fluid coupling in which the revolution of the fan is controlled by the air temperature at the circumference of the fan. In this conventional method, the temperature of air drawn through the radiator does not agree precisely the coolant liquid temperature, and may be higher, so that unnecessary rotation of the fan occurs.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluid coupling for an engine cooling system, comprising:
   a driving member;
   a driven member having an engine cooling element and enclosing a sealed working chamber, wherein said driving member comprises a rotor fitted in said working chamber and having input means drivable by an engine to be cooled;
   rotational torque coupling means between said driving member and said driven member, wherein said torque coupling means comprise a viscous fluid in said working chamber and engaging said rotor, whereby viscous shear in said viscous liquid transfers torque between said rotor and said driven member;
   an engine coolant liquid temperature sensor; and
   means for controlling said torque coupling means as a function of a sensed engine coolant liquid temperature,
   whereby said engine cooling element is driven as a function of the engine coolant liquid temperature,
   wherein said driven member comprises a casing rotatably supported by said driving member and a cover sealingly mounted to said casing, and wherein said means for controlling said torque coupling means comprise a plate sealingly held in said driven member and rotating therewith, said plate cooperating with said driven member to define said working chamber, said plate being movable toward and away from said rotor, whereby a volume of said working chamber varies so as to vary both an area of contact of said viscous liquid on said rotor and the torque transferred from said rotor to said driven member;
   wherein said means for controlling said torque coupling means further comprise:
   spring means for normally biasing said plate towards said rotor so as to decrease the volume of said working chamber, and
   means for applying a negative gas pressure to a pressure chamber at a side of said plate opposite said working chamber so as to increase the volume of said working chamber.

2. The coupling of claim 1 wherein said means for applying a negative pressure comprise:
   a valve controllable to selectively supply one of atmospheric pressure and negative pressure from an intake system of the engine to said pressure chamber; and
   a control unit comprising means for receiving coolant temperature signals from said sensor and controlling said valve as a function of said coolant temperature signals.

3. A fluid coupling for an engine cooling system, comprising:
   a driving member;
   a driven member having an engine cooling element and enclosing a sealed working chamber, wherein said driving member comprises a rotor fitted in said working chamber and having input means drivable by an engine to be cooled;
   rotational torque coupling means between said driving member and said driven member, wherein said torque coupling means comprise a viscous fluid in said working chamber and engaging said rotor, whereby viscous shear in said viscous liquid transfers torque between said rotor and said driven member;
   an engine coolant liquid temperature sensor; and
   means for controlling said torque coupling means as a function of a sensed engine coolant liquid temperature,
   whereby said engine cooling element is driven as a function of the engine coolant liquid temperature,
   wherein said driven member comprises a casing rotatably supported by said driving member and a cover sealingly mounted to said casing, and wherein said means for controlling said torque coupling means comprise a plate sealingly held in said driven member and rotating therewith, said plate cooperating with said driven member to define said working chamber, said plate being movable toward and away from said rotor, whereby a volume of said working chamber varies so as to vary both an area of contact of said viscous liquid on said rotor and the torque transferred from said rotor to said driven member,
   wherein said means for controlling said torque coupling means comprise spring means in said cover and biasing said plate for movement and means for applying to a pressure chamber at a side of said plate opposite said working chamber, as a function of a temperature sensed by said temperature sensor, a gas pressure opposing a force of said spring means.

4. The coupling of claim 3 wherein said torque coupling means further comprise labyrinth means on said rotor, and labyrinth means on at least one of said driven member and said plate at positions facing said labyrinth means on said rotor.

5. The coupling of claim 4 wherein said cooling element is a cooling fan mounted to said cover.

6. The coupling of claim 3 wherein said spring means normally biases said plate away from said rotor and said gas pressure is a positive pressure.

* * * * *